US00RE37018E

(19) United States
(12) Reissued Patent
Cronquist

(10) Patent Number: US RE37,018 E
(45) Date of Reissued Patent: Jan. 16, 2001

(54) FLAP FOR CEMENT TRUCK BACK

(76) Inventor: Jeff Cronquist, 2327 Chester Dr., Penngrove, CA (US) 94951

(21) Appl. No.: 09/258,120

(22) Filed: Feb. 25, 1999

Related U.S. Patent Documents

Reissue of:
(64) Patent No.: 5,605,398
Issued: Feb. 25, 1997
Appl. No.: 08/521,906
Filed: Aug. 31, 1995

(51) Int. Cl.[7] ..... B28C 7/16
(52) U.S. Cl. ..... 366/68; 366/44; 193/6
(58) Field of Search ..... 366/68, 42, 44, 366/45, 47; 193/10, 21, 6

(56) References Cited

U.S. PATENT DOCUMENTS 2,880,997 * 5/1959 Maxon ..... 366/68
3,334,972 * 8/1967 Levine et al. .
3,593,502 * 7/1971 Pelosi .
4,318,621 * 3/1982 Lawrence ..... 366/68
4,458,800 * 7/1984 Christenson .
4,688,667 * 8/1987 Peterson .
4,919,249 * 4/1990 Alexander ..... 193/6
5,186,299 * 2/1993 Stimson .
5,192,178 * 3/1993 Sibernagel .
5,354,128 * 10/1994 Lewis .

* cited by examiner

*Primary Examiner*—Tony G. Soohoo
(74) *Attorney, Agent, or Firm*—Garvey, Smith, Nehrbass & Doody, L.L.C.

(57) ABSTRACT

A rigid cover attached to the chute of a cement truck can prevent the accidental discharge of cement residue from the chute of the cement truck while the truck is moving. The use of a rigid cover prevents the bending of the cover under the weight of the cement residue. The rigid cover can be attached to an over-chute portion of the chute such that when the over-chute rests upon the main chute, the rigid cover can be positioned to prevent the accidental discharge of cement from the chute or can be flopped on top of the over-chute. The rigid cover is designed to hold back a substantial amount of cement residue.

60 Claims, 3 Drawing Sheets

FLAP FOR CEMENT TRUCK BACK

Matter enclosed in heavy brackets [ ] appears in the original patent but forms no part of this reissue specification; matter printed in italics indicates the additions made by reissue.

BACKGROUND OF THE INVENTION

This invention relates to apparatus for use with cement trucks. More particularly, this invention relates to apparatus used to prevent accidental discharge of cement from cement trucks.

Cement trucks typically have chutes which are used to pour cement at a construction site. Cement residue may form on the chute after the cement is poured. This cement residue may accidentally fall out of the chute while the truck is returning from the construction site. This may be a hazard to drivers behind the truck and may form undesirable deposits on the roads.

In order to avoid the cement residue from falling out of the chute while returning from the construction site, the chute is often washed off at the construction site. A disadvantage of this method is that a cement patch is formed at the site. For this reason, many cities and towns have laws preventing this practice.

One device that attempts to avoid this problem is described in Lewis, U.S. Pat. No. 5,354,128, entitled "Concrete Mixture Chute Cap". This patent describes a flexible material, such as canvas, that is attached to the back of a cement truck's chute with elastic straps. This device has two main disadvantages. The first disadvantage is that since the cap is made of a flexible material, the weight of the cement residue in the chute may be so great that the flexible material of the cap will begin to sag and possibly fall off the end of the chute. The second disadvantage of the flexible chute cap is that since it is not securely attached to the chute, the flexible chute cap needs to be separately stored and may get lost.

It is desired to have an apparatus that avoids these disadvantages.

SUMMARY OF THE INVENTION

The present invention uses a rigid cover or "flapper". The advantage of using a rigid cover is that it can better hold up to the weight of the cement residue. The rigid cover will not bend under the pressure of the cement residue like an elastic canvas chute cap. The rigid cover is designed to hold back a substantial amount of cement residue.

Additionally, the rigid cover is attached to the chute so that it can not get lost or require storage. The rigid cover can be hinged to the chute such that it can be positioned to prevent concrete residue from exiting the chute of the cement truck or can be positioned so that cement can be poured through the chute.

A preferred embodiment of the present invention is used with cement truck chutes which use an over-chute and a main chute portion. Many cement trucks use over-chutes which can be positioned on top of the main chute so that the cement can pour down this main chute or can be flipped down so that the over-chute and main chute form a longer chute.

In this preferred embodiment, the rigid cover is attached to the over-chute at a location so that when the over-chute is rested on the main chute, the rigid cover can be positioned to prevent the cement from accidentally discharging from the chute or the rigid cover can be flopped on top of the over-chute so that the cement can be poured through the main chute. When the over-chute is put down to form the longer chute, the rigid cover is automatically put underneath the chute and main chute.

The rigid cover can be attached with a hinge at a location near the curved edge of the over-chute which contacts a main chute when the longer chute is formed. This preferred location is best seen with the figures discussed below.

A latching device can be used to latch the rigid cover to the main chute. The rigid cover may have a flange positioned so that it will surround portions of the main chute when the cover is closed to help prevent cement from accidentally discharging from the chute. Additionally, a safety chain can be used to hold the rigid cover in position when the chute is used to pour concrete. The rigid cover also can have a handle which helps in its positioning.

BRIEF DESCRIPTION OF THE DRAWINGS

The above and other features and aspects of the present invention will become more apparent upon reading the following detailed description in conjunction with the accompanying drawings in which.

DETAILED DESCRIPTION OF THE PREFERRED EMBODIMENT

Figure 1:
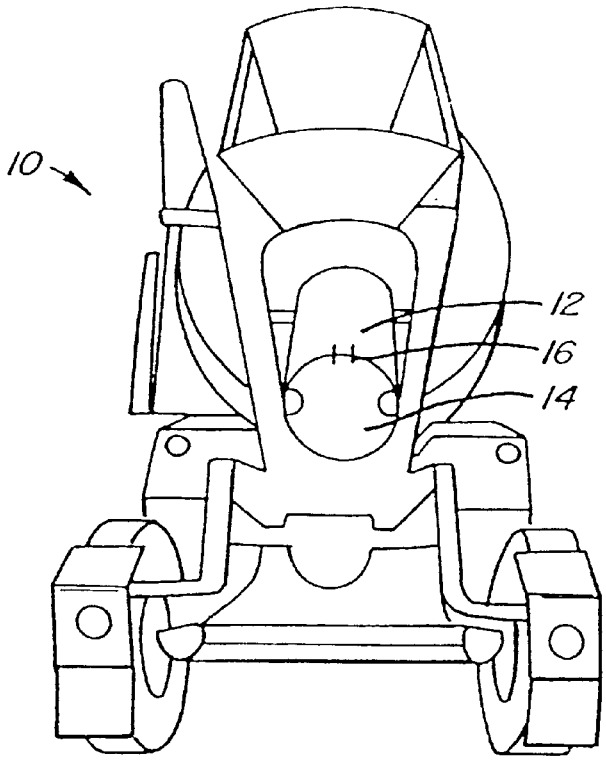
FIG. 1 is a perspective view showing the back of a cement truck with a rigid cover attached to a chute.

FIG. 1 is a perspective view of a cement truck 10 which has a chute 12 and rigid cover 14. The rigid cover 14 is attached to the chute 12 with a hinge 16. By positioning the rigid cover 14 over the end of the chute 12, the cement residue in chute 12 is prevented from accidentally discharging from the truck 10.

Figure 2:
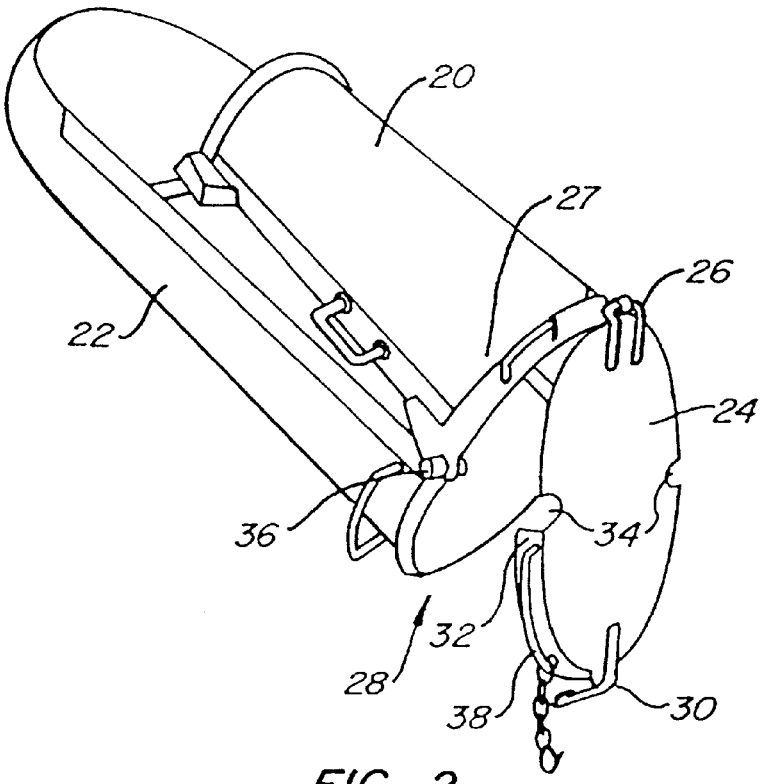
FIG. 2 is a partial perspective view showing a main chute, an over-chute and the rigid cover.

FIG. 2 is a partial perspective view showing that over-chute 20 positioned on top of the main chute 22. The rigid cover 24 is connected to the over-chute 20 with a hinge 26. The apparatus includes a latch 30 on the rigid cover 24 that attaches to a lip on the bottom of the main chute 22. The latch can be used to secure the rigid cover against the chute. Alternately, the latch could be a two part latch including a first latch part attached to the main chute and second latch part on the rigid cover 24. The rigid cover 24 also includes a flange 32 which surrounds a portion of the main chute 22 when the rigid cover 24 is positioned next to the main chute 22. The flange 32 helps prevent the cement residue from accidentally discharging from the chute.

When the rigid cover 24 is closed, the top part of the chute can be partially washed off. In that case, the water and cement residue will collect at the bottom of the chute near the rigid cover 24. Flange 32 will prevent the water and cement residue from exiting the chute.

The rigid cover 24 optionally includes indentations 34 at locations to accommodate the hinges 36 that connect the over-chute to the main chute. Handles 38 are used to move the rigid cover 24 with respect to the hinge 26.

The rigid cover 24 can be attached to pre-existing cement truck chutes. As shown in FIG. 2, the chute only has to be modified to include the hinge 26 attached to the over-chute 20.

Figure 3:
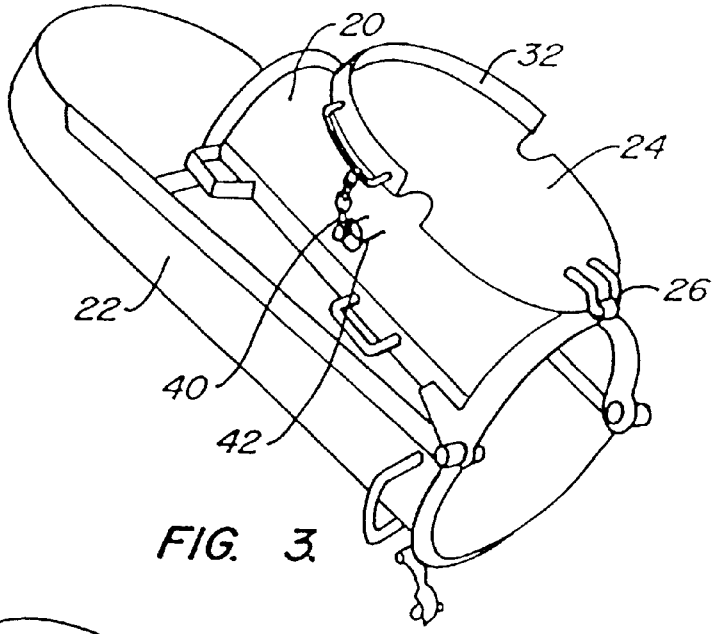
FIG. 3 is a partial perspective view showing the main chute, over-chute and rigid cover wherein the rigid cover is positioned on top of the over-chute.

FIG. 3 is a partial perspective view showing the rigid cover 24 positioned on top of the over-chute 20. In this position the rigid cover 24 is out of the way of the main chute 22 so that cement can be poured through the main chute. The rigid cover 24 can be attached to the over-chute 20 with the safety chain 40. The safety chain 40 attaches to a hook 42 on the over-chute 20.

Figure 4:
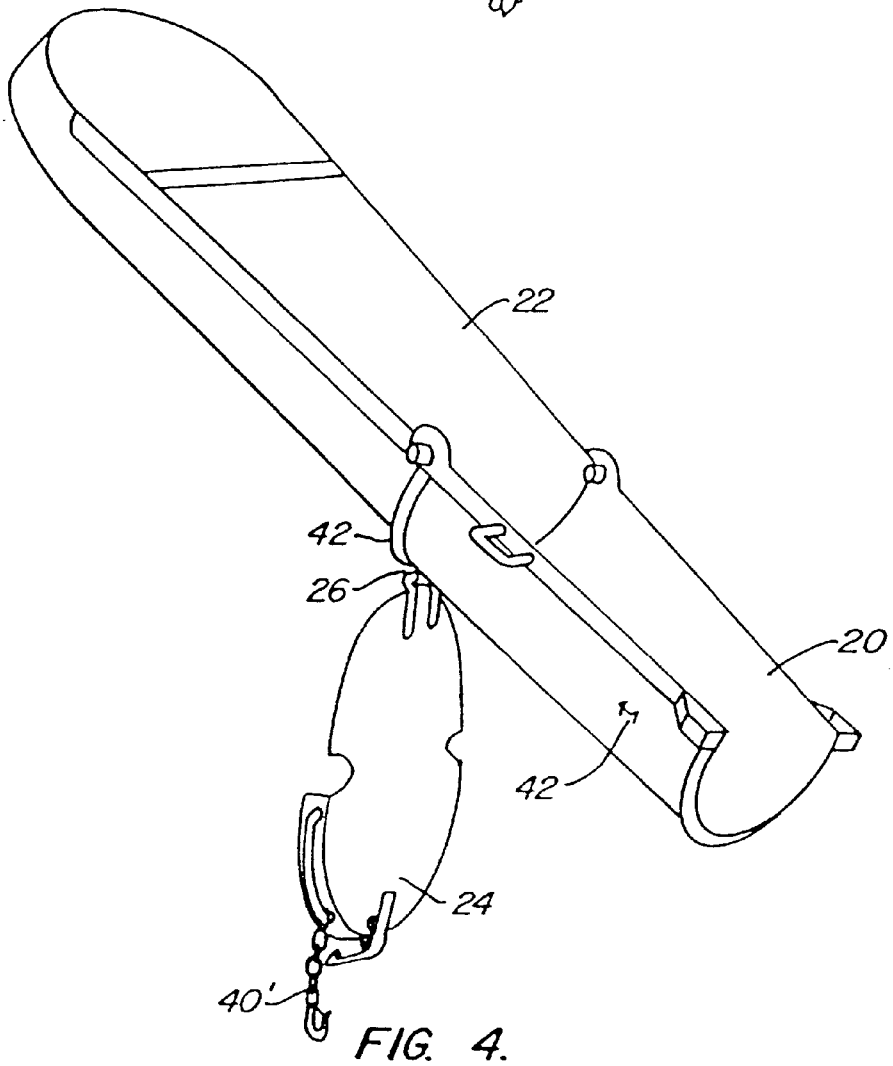
FIG. 4 is a partial perspective view showing the main chute, over-chute and rigid cover wherein the over-chute is flopped down to form the longer chute and the rigid cover is positioned underneath the main chute and over-chute.

FIG. 4 is a partial perspective view showing the over-chute 20 and main shoot 22 positioned to form a longer chute. The rigid cover 24 automatically flops down to a position underneath the main chute 22 when the over-chute 20 is flopped down from its resting position on top of the main chute 22. The safety chain 40 can be attached to the hook 42. Another advantage of the embodiment shown in FIG. 4 is that the rigid cover in this position acts as a shield to protect the truck from splashing cement. When cement is poured into grout pumps, the cement has a tendency to splash back toward the truck. The rigid cover 24 in the position shown in FIG. 4 prevents the splashing cement from contacting the truck.

FIGS. 2–4 show the advantages of a rigid cover attached at the position of hinge 26. As shown in FIGS. 2 and 3, the position of hinge 26 is such that when the over-chute 20 rests on the main chute 22, the rigid cover 24 can be positioned to prevent cement residue from discharging from the chute or can be flopped on top of the chute. As shown in FIG. 4, the hinge 26 does not prevent the over-chute 20 and main chute 22 from forming the longer chute. This is because the hinge 26 is positioned on the outside of chute 20 which is near the curved edge 42 of the over-chute 20 but placed in a manner such that the curved edge 42 of the over-chute 20 is not prevented from contacting the curved edge of the main chute 22.

Figure 5A:
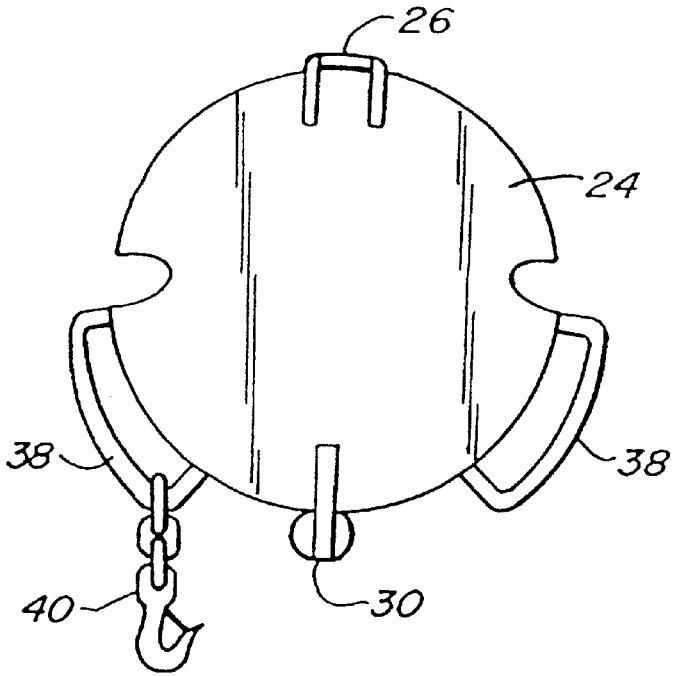
FIG. 5A is a front view of the rigid cover.

FIG. 5A shows a front view of the rigid cover 24. This view shows the hinge 26, latch 30, handles 38, safety chain 40.

Figure 5B:
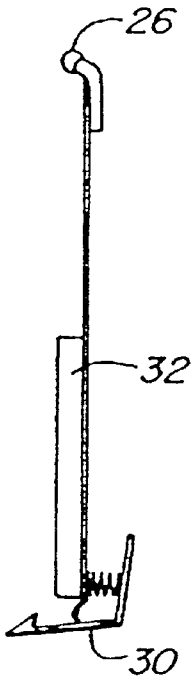
FIG. 5B is a side view of the rigid cover shown in FIG. 5A.

FIG. 5B is a side view of the rigid cover shown in FIG. 5A. This view shows a hinge 26, flange 32 and latch 30.

The rigid cover of the present invention can be constructed of a variety of materials. In a preferred embodiment, the rigid cover 24 is constructed of 12 gauge metal. Alternately, the cover 24 can be formed of a stiff rubber or plastic material, fiberglass, or any other rigid material. The rigid cover may also be formed out of a combination of such materials. Additionally, safety tape (not shown) or another type of reflective material can be put on the rigid cover to increase the cement truck's visibility.

As shown in FIG. 2–4, the rigid cover 24 is preferably attached with a hinge 26 at position so that the gravity is pulling straight down on hinge 26 rather than putting a twisting motion on the hinge 26. This twisting motion may occur if the hinge was positioned at a location such as location 27 shown in FIG. 2.

Various details of the implementation and method are merely illustrative of the present invention. It will be understood that various changes and such details may be within the scope of the invention, which is to be limited only by the appended claims.

What is claimed is:

1. An apparatus which prevents the unintentional escape of cement from a cement truck comprising:

a main chute;

an over-chute hingeably connected to the main chute, the hinged connection of the over-chute to the main chute being such that the over-chute can be positioned to rest on top of the main chute and the hinged connection being such that the over-chute can be folded down from this resting position so that the main chute and over-chute section form an elongated chute through which cement can be poured; and a rigid cover connected by a hinge to the over-chute, the hinged connection of the rigid cover to the over-chute being such that when the over-chute is positioned to rest on the main chute, the rigid cover can be positioned against the main chute so as to prevent any cement material from accidentally escaping from the main chute, and when the over-chute is folded down, the rigid cover is positioned under the main chute and over-chute.

2. The apparatus of claim 1, wherein the rigid cover is made of metal.

3. The apparatus of claim 1, wherein the rigid cover comprises a stiff rubber material.

4. The apparatus of claim 1, wherein the rigid cover comprises a plastic material.

5. The apparatus of claim 1, wherein the rigid cover comprises a fiberglass material.

6. The apparatus of claim 1, wherein the apparatus further comprises a latch attached to the rigid cover, wherein the latch on the rigid cover can be connected to the bottom of the main chute when the over-chute rests on main chute, wherein when the latch on the rigid cover is connected to the bottom of the main chute the rigid cover prevents cement from exiting through the main chute.

7. The apparatus of claim 1, wherein the apparatus further comprises a latch with a first latch part attached at the bottom of the main chute and a second latch part attached to the rigid cover, wherein the first and second latch parts can be connected together when the over-chute rests on main chute, wherein when the first and second latch parts are connected together the rigid cover prevents cement from exiting through the main chute.

8. The apparatus of claim 1, wherein the hinged connection of the rigid cover to the over-chute is such that when the over-chute is positioned to rest on the main chute, the rigid cover may be positioned to rest on top of the over-chute.

9. The apparatus of claim 8, wherein a safety chain is attached to the rigid cover, and wherein the rigid cover may be secured to the over-chute with the safety chain when the rigid cover is positioned to rest on top of the over-chute.

10. The apparatus of claim 1, wherein rigid cover further comprises at least one handle to aid in the rotation of the rigid cover about the hinge connecting the rigid cover to the over-chute.

11. The apparatus of claim 1, wherein the rigid cover includes a flange which is shaped such that when the rigid cover is positioned against the main chute, the flange fits underneath portions of the main chute.

12. The apparatus of claim 1, wherein the main chute and over-chute are half-tube shaped such that the main chute and over-chute each define two linear edges, wherein the hinged connection of the main chute with the over-chute comprises two hinges which each connect an edge of the over-chute with an edge of the main chute.

13. The apparatus of claim 12, wherein the rigid cover is substantially circular in shape.

14. The apparatus of claim 13, wherein the rigid cover has indentations so that the two hinges connecting the main chute and the over-chute can extend therethrough.

15. An apparatus which prevents the unintentional escape of cement from a cement truck comprising:

a main chute having a portion which is substantially half-tube shaped defining two substantially linear edges and at least one curved edge;

an over-chute which is substantially half-tube shaped defining two substantially linear edges and two curved edges, the main chute and the over-chute being connected by two hinges, each hinge connecting one of the two linear edges on the main chute to one of the linear edges on the half chute, wherein a first curved edge of the two curved edges of the over-chute is adjacent to the two hinges; and a rigid cover connected by an additional hinge to a portion of the over-chute near the first curved edge of the over-chute on the side of the over-chute that is outside the curve defined by its half-tube shape.

16. The apparatus of claim 15, wherein the additional hinge is located such that as the rigid cover is rotated about the additional hinge the center of gravity of rigid cover defines a plane that extends through the additional hinge and is substantially perpendicular to the ground.

17. The apparatus of claim 15, wherein the rigid cover is substantially circular in shape.

18. The apparatus of claim 17, wherein the rigid cover includes a flange portion.

19. An apparatus which prevents the unintentional escape of cement from a cement truck comprising:

chute for dispensing cement, the chute comprising a main chute portion and an over-chute portion, the main chute portion and the over-chute portion being connected by hinges such that the over-chute portion can be positioned on top of the main chute portion and so that over-chute portion can be folded down from this resting position; and a rigid cover connected by a single hinge to the chute, the hinged connection of the rigid cover to the chute being such that the rigid cover can be positioned against the chute so as to prevent cement material from accidentally escaping from the chute, and the rigid cover can be positioned on top of the chute to allow cement to pour.

20. The apparatus of claim 19, wherein the rigid cover can be positioned against the chute so as to prevent cement material from accidentally escaping from the chute when the over-chute portion is positioned on top of the main chute portion and wherein the rigid cover is positioned underneath the over-chute portion and main chute portion when the over-chute portion is folded down from the resting position.

*21. An apparatus which prevents the unintentional escape of cement from a cement truck comprising:*

*a main chute;*

*an over-chute hingeably connected to the main chute, the hinged connection of the over-chute to the main chute being such that the over-chute can be positioned to rest on top of the main chute and the hinged connection being such that the over-chute can be folded down from this resting position so that the main chute and over-chute section from an elongated chute through which cement can be poured; and*

*a rigid cover connected to the over-chute, the connection of the rigid cover to the over-chute being such that when the over-chute is positioned to rest on the main chute, the rigid cover can be positioned against the main chute so as to prevent any cement material from accidentally escaping from the main chute.*

*22. The apparatus of claim 21, wherein the rigid cover is made of metal.*

*23. The apparatus of claim 21, wherein the rigid cover comprises a stiff rubber material.*

*24. The apparatus of claim 21, wherein the rigid cover comprises a plastic material.*

*25. The apparatus of claim 21, wherein the rigid cover comprises a fiberglass material.*

*26. The apparatus of claim 21, wherein the apparatus further comprises a latch attached to the rigid cover, wherein the latch on the rigid cover can be connected to the bottom of the main chute when the over-chute rests on main chute, wherein when the latch on the rigid cover is connected to the bottom of the main chute the rigid cover prevents cement from existing through the main chute.*

*27. The apparatus of claim 21, wherein the apparatus further comprises a latch with a first latch part attached at the bottom of the main chute and a second latch part attached to the rigid cover, wherein the first and second latch parts can be connected together when the over-chute rests on main chute, wherein when the first and second latch parts are connected together the rigid cover prevents cement from exiting through the main chute.*

*28. The apparatus of claim 21, wherein the connection of the rigid cover to the chute-chute is such that when the over-chute is positioned to rest on the main chute, the rigid cover may be positioned to rest on top of the over-chute.*

*29. The apparatus of claim 28, wherein a safety chain is attached to the rigid cover, and wherein the rigid cover may be secured to the over-chute with the safety chain when the rigid cover is positioned to rest on top of the over-chute.*

*30. The apparatus of claim 21, wherein the rigid cover is connected with a hinge to the over-chute and further comprises at least one handle to aid in the rotation of the rigid cover about the hinge connecting the rigid cover to the over-chute.*

*31. The apparatus of claim 21, wherein the rigid cover includes a flange which is shaped such that when the rigid cover is positioned against the main chute, the flange fits underneath portions of the main chute.*

*32. The apparatus of claim 21, wherein the main chute and over-chute are half-tube shaped such that the main chute and over-chute each define two linear edges, wherein the hinged connection of the main chute with the over-chute comprises two hinges which each connecting an edge of the over-chute with an edge of the main chute.*

*33. The apparatus of claim 32, wherein the rigid cover is substantially circular in shape.*

*34. The apparatus of claim 33, wherein the rigid cover has indentations so that the two hinges connecting the main chute and the over-chute can extend therethrough.*

*35. The apparatus which prevents the unintentional escape of cement from a cement truck comprising:*

*a main chute having a portion which is substantially half-tube shaped defining two substantially linear edges and at least one curved edge;*

*an over-chute which is substantially half-tube shaped defining two substantially linear edges and two curved edges, the main chute and the over-chute being connected by two hinges, each hinge connecting one of the two linear edges on the main chute to one of the linear edges on the half-chute, wherein a first curved edge of the two curved edges of the over-chute is adjacent to the two hinges; and*

*a rigid cover connected to a portion of the over-chute near the first curved edge of the over-chute on the side of the over-chute that is outside the curve defined by its half-tube shape.*

*36. The apparatus of claim 35, wherein the connection is located such that as the rigid cover is rotated about the connection the center of gravity of rigid cover defines a plane that extends through the connection and is substantially perpendicular to the ground.*

*37. The apparatus of claim 35, wherein the rigid cover is substantially circular in shape.*

*38. The apparatus of claim 37, wherein the rigid cover includes a flange portion.*

*39. An apparatus which prevents the unintentional escape of cement from a cement truck comprising:*

*a chute for dispensing cement, the chute comprising a main chute portion and an over-chute portion, the main chute portion and the over-chute portion being connected by hinges such that the over-chute portion can be positioned on top of the main chute portion and so that over-chute portion can be folded down from this resting position; and*

*a rigid cover connected to the chute, the connection of the rigid cover to the chute being such that the rigid cover can be positioned against the chute so as to prevent cement material from accidentally escaping from the chute, and the rigid cover can be positioned to allow cement to pour.*

*40. The apparatus of claim 39, wherein the rigid cover can be positioned against the chute so as to prevent cement material from accidentally escaping from the chute when the over-chute portion is positioned on top of the main chute portion and wherein the rigid cover is positioned underneath the over-chute portion and main chute portion when the over-chute portion is folded down from the resting position.*

*41. An apparatus which prevents the unintentional escape of cement from a cement truck comprising:*

*a main chute;*

*an over-chute hingeably connected to the main chute, the hinged connection of the over-chute to the main chute being such that the over-chute can be positioned to rest on top of the main chute and the hinged connection being such that the over-chute can be folded down from this resting position so that the main chute and over-chute section form an elongated chute through which cement can be poured; and*

*a rigid cover connected by a hinge means to the over-chute, the connection of the rigid cover to the over-chute being such that when the over-chute is positioned to rest on the main chute, the rigid cover can be positioned against the main chute so as to prevent any cement material from accidentally escaping from the main chute.*

*42. The apparatus of claim 41, wherein the rigid cover is made of metal.*

*43. The apparatus of claim 41, wherein the rigid cover comprises a stiff rubber material.*

*44. The apparatus of claim 41, wherein the rigid cover comprises a plastic material.*

*45. The apparatus of claim 41, wherein the rigid cover comprises a fiberglass material.*

*46. The apparatus of claim 41, wherein the apparatus further comprises a latch attached to the rigid cover, wherein the latch on the rigid cover can be connected to the bottom of the main chute when the over-chute rests on main chute, wherein when the latch on the rigid cover is connected to the bottom of the main chute the rigid cover prevents cement from exiting through the main chute.*

*47. The apparatus of claim 41, wherein the apparatus further comprises a latch with a first latch part attached at the bottom of the main chute and a second latch part attached to the rigid cover, wherein the first and second latch parts can be connected together when the over-chute rests on main chute, wherein the first and second latch parts are connected together the rigid cover prevents cement from exiting through the main chute.*

*48. The apparatus of claim 41, wherein the connection of the rigid cover to the over-chute is such that when the over-chute is positioned to rest on the main chute, the rigid cover may be positioned to rest on top of the over-chute.*

*49. The apparatus of claim 48, wherein a safety chain is attached to the rigid cover, and wherein the rigid cover may be secured to the over-chute with the safety chain when the rigid cover is positioned to rest on top of the over-chute.*

*50. The apparatus of claim 41, wherein the rigid cover is connected with a hinge to the over-chute and further comprises at least one handle to aid in the rotation of the rigid cover about the hinge connecting the rigid cover to the over-chute.*

*51. The apparatus of claim 41, wherein the rigid cover includes a flange which is shaped such that when the rigid cover is positioned against the main chute, the flange fits underneath portions of the main chute.*

*52. The apparatus of claim 41, wherein the main chute and over-chute are half-tube shaped such that the main chute and over-chute each define two linear edges, wherein the hinged connection of the main chute with the over-chute comprises two hinges which each connect an edge of the over-chute with an edge of the main chute.*

*53. The apparatus of claim 52, wherein the rigid cover is substantially circular in shape.*

*54. The apparatus of claim 53, wherein the rigid cover has indentations so that the two hinges connecting the main chute and the over-chute can extend therethrough.*

*55. An apparatus which prevents the unintentional escape of cement from a cement truck comprising:*

*a main chute having a portion which is substantially half-tube shaped defining two substantially linear edges and at least one curved edge;*

*an over-chute which is substantially half-tube shaped defining two substantially linear edges and two curved edges, the main chute and the over-chute being connected by two hinges, each hinge connecting one of the two linear edges on the main chute to one of the linear edges on the half chute, wherein a first curved edge of the two curved edges of the over-chute is adjacent to the two hinges; and*

*a rigid cover connected by hinge means to a portion of the over-chute near the first curved edge of the over-chute on the side of the over-chute that is outside the curve defined by its half-tube shape.*

*56. The apparatus of claim 55, wherein the connection is located such that as the rigid cover is rotated about the connection the center of gravity of rigid cover defines a plane that extends through the connection and is substantially perpendicular to the ground.*

*57. The apparatus of claim 55, wherein the rigid cover is substantially circular in shape.*

*58. The apparatus of claim 57, wherein the rigid cover includes a flange portion.*

*59. An apparatus which prevents the unintentional escape of cement from a cement truck comprising:*

*a chute for dispensing cement, the chute comprising a main chute portion and an over-chute portion, the main chute portion and the over-chute portion being connected by hinges such that the over-chute portion can be positioned on top of the main chute portion and so that over-chute portion can be folded down from this resting position; and*

*a rigid cover connected by hinge means to the chute, the connection of the rigid cover to the chute being such that the rigid cover can be positioned against the chute so as to prevent cement material from accidentally escaping from the chute, and the rigid cover can be positioned to allow cement to pour.*

*60. The apparatus of claim 59, wherein the rigid cover can be positioned against the chute so as to prevent cement material from accidentally escaping from the chute when the over-chute portion is positioned on top of the main chute portion and wherein the rigid cover is positioned underneath the over-chute portion and main chute portion when the over-chute portion is folded down from the resting position.*

* * * * *